United States Patent
Wang et al.

(10) Patent No.: US 12,474,315 B2
(45) Date of Patent: Nov. 18, 2025

(54) DETECTION SYSTEM AND DETECTION METHOD FOR COMPOSITE DETECTOR

(71) Applicant: CORNEX NEW ENERGY CO., LTD., Hu Bei (CN)

(72) Inventors: Yunxia Wang, Hu Bei (CN); Xibin Wu, Hu Bei (CN); Xiangnan Bu, Hu Bei (CN); Yuanfu Jiang, Hu Bei (CN); Leijun Zhou, Hu Bei (CN); Yi Zhang, Hu Bei (CN)

(73) Assignee: CORNEX NEW ENERGY CO., LTD., Hu Bei (CN)

( * ) Notice: Subject to any disclaimer, the term of this patent is extended or adjusted under 35 U.S.C. 154(b) by 245 days.

(21) Appl. No.: 18/349,019

(22) Filed: Jul. 7, 2023

(65) Prior Publication Data

US 2024/0167992 A1    May 23, 2024

(30) Foreign Application Priority Data

Nov. 21, 2022    (CN) .......................... 202211458240.7

(51) Int. Cl.
*G01N 33/00*    (2006.01)

(52) U.S. Cl.
CPC ....... *G01N 33/007* (2013.01); *G01N 33/0006* (2013.01); *G01N 33/0072* (2024.05)

(58) Field of Classification Search
CPC ...... G08B 29/145; G08B 29/20; G08B 17/10; G08B 17/117; G01N 21/65;
(Continued)

(56) References Cited

U.S. PATENT DOCUMENTS

| 2013/0074575 A1 | 3/2013 | Duric et al. |
| 2021/0131903 A1 | 5/2021 | Ghasemvand et al. |

FOREIGN PATENT DOCUMENTS

| CN | 108072623 A | 5/2018 |
| CN | 109946634 A * | 6/2019 |

(Continued)

OTHER PUBLICATIONS

Gulsoy, Real-time simultaneous monitoring of internal temperature and gas pressure in cylindrical cells during thermal runaway, 2024 (Year: 2024).*

(Continued)

*Primary Examiner* — John E Breene
*Assistant Examiner* — Truong D Phan
(74) *Attorney, Agent, or Firm* — Ingrassia Fisher & Lorenz, LLP

(57) ABSTRACT

The present disclosure provides a detection system and a detection method for a composite detector, comprising a composite detector, a constant-temperature box, a smoke generator, a standard gas storage tank, a gas collection device and a laser Raman spectroscopy analyzer; the constant-temperature box is sealed, and both the composite detector and the gas collection device are arranged in the constant-temperature box; the smoke generator, the standard gas storage tank and the laser Raman spectroscopy analyzer are all arranged outside the constant-temperature box; the constant-temperature box, the smoke generator, and the standard gas storage tank are used to simulate the environment battery thermal runaway, the laser Raman spectroscopy analyzer obtains a first detection data of gas, the composite detector obtains a second detection data, by comparing and analyzing the first detection data with the second detection data, the composite detector is calibrated (Continued)

and a qualitative and quantitative detection result is obtained.

12 Claims, 2 Drawing Sheets

(58) Field of Classification Search
CPC ............ G01N 33/0006; G01N 33/007; G01N 33/0072; H01M 10/48
USPC ................................................ 73/1.06, 865.6
See application file for complete search history.

(56) References Cited

FOREIGN PATENT DOCUMENTS

| | | | |
|---|---|---|---|
| CN | 110296952 | A | 10/2019 |
| CN | 210442338 | U | 5/2020 |
| CN | 111812279 | A | 10/2020 |
| CN | 111830201 | A | 10/2020 |
| CN | 112710788 | A | 4/2021 |
| CN | 113223284 | A | 8/2021 |
| CN | 113516824 | A | 10/2021 |
| CN | 215599101 | U | 1/2022 |
| KR | 101846451 | B1 | 4/2018 |

OTHER PUBLICATIONS

Wang, Thermal runaway and flame propagation in battery packs: numerical simulation and deep learning prediction, 2025 (Year: 2024).*
He Lin, "Power Battery", Mechanical Industry Press, pp. 284-290, May 2021.

\* cited by examiner

Prior Art

DETECTION SYSTEM AND DETECTION METHOD FOR COMPOSITE DETECTOR

CROSS-REFERENCE TO RELATED APPLICATION

This application claims priority to Chinese Patent Application No. 202211458240.7, filed Nov. 21, 2022, which is incorporated herein by reference in its entirety.

FIELD OF INVENTION

This application pertains to the field of lithium battery box protection technology, in particular to detection system and detection method for composite detector.

BACKGROUND OF THE INVENTION

Traditional fire composite detectors are mostly temperature and smoke composite detectors, which detect a signal only after a fire and/or smoke occurs, and there is a possibility that a serious safety accident is caused due to the fact that a detection signal lags behind the ejection delay of a fire-fighting inhibitor.

According to the data released by lithium battery manufacturers, the combustible gas generated by emitting from the valve during the thermal run-away control of the lithium battery mainly comprises hydrogen, carbon monoxide, VOC (Volatile Vrganic Vompounds), carbon dioxide, nitrogen, methane, butane, ethylene, etc., and VOC is a volatile organic compound. At present, composite detectors for monitoring combustible gas, temperature and smoke have emerged on the market. As an important component of fire fighting system of the energy storage, they are generally installed in a battery pack, a power cabinet and a container, mainly used for detecting thermal runaway of a lithium battery. By monitoring the changes in carbon monoxide, VOC, hydrogen, temperature and smoke in the area, the composite detectors can make an accurate detection and send an alarm in the early stages of thermal runaway of lithium batteries. The staff can handle the fire before it occurs to avoid safety accidents.

The composite detector needs to be detected before being put into use to ensure its normal function and accurate accuracy. However, with regard to the detection of a compound detector, there is no standard detection method at present, and a simple qualitative detection method is commonly used. Without a quantitative calibration detection method, the detection result will be inaccurate, resulting in that composite detectors with a relatively large accuracy error flows into the market and brings a potential safety hazard to energy storage systems.

The main problems with existing technology comprise: (1) For example, CN113223284A provides a method and system for on-site detection and calibration of point-type smoke and temperature fire detectors, but it is unable to detect composite detectors; CN105355008B proposes a detection instrument for detecting fire alarm detectors, which is used for detecting smoke, temperature, or flame related alarm detectors, but cannot detect composite detectors. (2) The detection methods in the prior art are too rough and the detection instruments are relatively simple, which can only conduct simple qualitative analysis to preliminarily determine whether the function of the composite detector is normal, but cannot quantitatively detect the detector, which has great limitations. (3) At present, the detection method of smoke fire detectors mainly adopts the traditional claves-adding cigarette form. The burning of the claves produces soot, polycyclic aromatic hydrocarbons, volatile organic compounds, etc. After cigarette ignition, a large amount of tar, carbon monoxide, nicotine, soot, and irritating smoke can be released. Soot and tar will be adsorbed on the components, PCB (Printed Circuit Board) boards, and wiring harness connectors inside the detector, which may cause aging, pollution, and poor contact of the detector, resulting in false alarms and missed alarms of the composite probes. (4) The power level, gear intensity, and air vent direction of the hot air gun can all affect the temperature of the monitoring points inside the sealed box. There are too many variable factors, and the measured temperature data is inaccurate.

In the prior art, qualitative detection is generally performed on a composite detector. For example, as shown in FIG. 1, roughly simulating an environment of thermal runaway of a battery. In a sealed box body, insert a lit incense stick or cigarette into a smoke gun, use a fan to blow smoke and carbon monoxide into the sealed box, use alcohol to simulate VOC components, and turn on the hot air gun to increase the temperature inside the sealed box. During the attempt to simulate the thermal runaway environment, if the detection indicators (carbon monoxide, smoke, VOC, temperature) exactly reach the alarm threshold, the composite detector will send out corresponding alarm signals to achieve the detecting purpose.

The composite detector, relay module and upper computer communicate with each other through CAN (Controller Area Network), and when a lithium battery thermal runaway environment is simulated in a sealed box, the upper computer displays the detected gas concentration, smoke concentration, temperature and other indicators. This method is only suitable for qualitative detection of the detector. In addition, other objects, desirable features and characteristics will become apparent from the subsequent summary and detailed description, and the appended claims, taken in conjunction with the accompanying drawings and this background.

SUMMARY

The purpose of the present disclosure is to provide a detection system and detection method for a composite detector, which can scientifically determine whether the sensitivity, detection accuracy and functionality of the composite detector meet the technical requirements.

In order to achieve the above-mentioned purpose, the present disclosure provides the following technical solutions.

A detection system for a composite detector comprises a composite detector, a constant-temperature box, a smoke generator, a standard gas storage tank, a gas collection device and a laser Raman spectroscopy analyzer; wherein the constant-temperature box is sealed, and both the composite detector and the gas collection device are arranged in the constant-temperature box; the smoke generator, the standard gas storage tank and the laser Raman spectroscopy analyzer are all arranged outside the constant-temperature box; the constant-temperature box, the smoke generator, and the standard gas storage tank are used to simulate a battery thermal runaway environment, the laser Raman spectroscopy analyzer receives gas from the gas collection device for detection and obtains a first detection data of gas, the composite detector can obtain a second detection data, and by comparing and analyzing the first detection data with the second detection data, the composite detector is calibrated, and a qualitative and quantitative detection result is obtained.

Further, the detection system for a composite detector further comprises a data information collection and transmission device and an upper computer, wherein the laser Raman spectroscopy analyzer is connected to the upper computer, and the composite detector is connected to the upper computer through the data information collection and transmission device; the upper computer compares and analyzes the first detection data with the second detection data.

Further, in the detection system for a composite detector, the standard gas storage tank comprises a hydrogen storage tank, a carbon monoxide storage tank and a VOC storage tank.

Further, in the detection system for a composite detector, detection accuracy of the laser Raman spectroscopy analyzer is 1% FS.

In another aspect, the present disclosure provides a detection method for a composite detector utilizing the detection system for a composite detector, wherein the detection method comprises the following steps of:

S1: turning on the composite detector, and turning on the laser Raman spectroscopy analyzer for preheating;

S2: turning on the constant temperature box, and setting a constant temperature, and the temperature being maintained at 2° C. above a temperature sensing threshold of the composite detector by;

S3: turning on the smoke generator and controlling a smoke concentration to reach a calibration value within a predetermined time, and turning off the smoke generator when the smoke concentration reaches the calibration value;

S4: turning on the standard gas storage tanks, for example, the standard gas storage tank can comprise a VOC storage tank, a hydrogen storage tank, and a carbon monoxide storage tank, etc., then the VOC storage tank, hydrogen storage tank and carbon monoxide storage tank can be turned on sequentially in S4, the concentrations of VOC, hydrogen and carbon monoxide are controlled to reach the calibration value within a predetermined time; when the concentrations of VOC, hydrogen and carbon monoxide reach the calibration value, the corresponding VOC storage tank, hydrogen storage tank, and carbon monoxide storage tank is turned off;

S5: by comparing and analyzing the first detection data with the second detection data, the composite detector is calibrated and a qualitative and quantitative detection result is obtained. Specifically, when the detection system of the composite detector also comprises a data information collection and transmission device and an upper computer, the S5 specifically comprises the following steps of:

S51: within a specified detection time, the first detection data and the second detection data being transmitted to the upper computer through the data information collection and transmission device;

S52: the upper computer comparing and analyzing the first detection data with the second detection data;

S53. performing qualitative and quantitative analysis of detection accuracy of the composite detector.

Further, in the detection method of the composite detector, the predetermined time in S3 is 1 minute to 2 minutes.

Further, in the detection method of the composite detector, the predetermined time in S4 is 2 minutes to 3 minutes.

Further, in the detection method of the composite detector, the predetermined time in S5 is 6 minutes to 8 minutes.

Further, in the detection method of the composite detector, the first detection data comprises gas component and concentration changes of smoke, hydrogen, VOC and carbon monoxide in S5; the second detection data comprises temperature inside the constant temperature chamber, and gas component and concentration changes of smoke, hydrogen, VOC and carbon monoxide.

Further, in the detection method of the composite detector, preheating the laser Raman spectroscopy analyzer for 20 minutes in S1, and maintaining a constant temperature for 30 minutes in S2.

Analysis shows that the present disclosure discloses a detection system and detection method for a composite detector, provides a qualitative and quantitative detection method for a composite detectors (carbon monoxide, hydrogen, VOC, temperature, smoke), and uses standard gas generators or standard gas storage tanks to simulate an environment of battery thermal runaway. By comparing the first detection data with the second detection data synchronously to scientifically determine whether the sensitivity, detection accuracy, and functionality of the composite detector meet technical requirements. The detection method is compliant and more suitable for standardized promotion and use, and the accuracy of the detection instrument meets the needs of quantitative detection and calibration. In addition to the gas component, temperature and smoke to be detected, it can eliminate the interference of other impurities (such as soot, polycyclic aromatic hydrocarbons, tar or nicotine), reduce the dependent variable, and do not cause pollution and aging effects on the composite detector, so the detection method is more scientific. By keeping the temperature value inside the sealed box constant and consistent with the set temperature value, scientifically and reasonably control the temperature of the environment to be detected, and the detection results are more informative. Based on the various characteristic gases generated during the thermal runaway of lithium batteries, this detection system can select different standard gases for the gas components to be detected, such as carbon monoxide standard gas, hydrogen standard gas, VOC, carbon dioxide standard gas, and alkane standard gas, which can meet the calibration requirements of composite detectors with multiple gas components.

BRIEF DESCRIPTION

The present invention will hereinafter be described in conjunction with the following drawing figures, wherein like numerals denote like elements, and:

DETAILED DESCRIPTION OF THE EMBODIMENTS

The following detailed description is merely exemplary in nature and is not intended to limit the invention or the application and uses of the invention. Furthermore, there is no intention to be bound by any theory presented in the preceding background of the invention or the following detailed description.

The present disclosure will be explained in detail below with reference to the accompanying drawings and embodiments. Each example is provided through the interpretation of the present disclosure rather than limiting it. In fact, those skilled in the art will be aware that modifications and variations can be made in the present disclosure without departing from the scope or spirit of the present disclosure. For example, features shown or described as part of one embodiment may be used in another embodiment to generate another embodiment. Therefore, it is expected that the present disclosure comprises such modifications and variations within the scope of the accompanying claims and their equivalents.

In the description of the present disclosure, the terms "transverse", "longitudinal", "up", "bottom", "front", "back", "left", "right", "vertical", "horizontal", "top", "bottom", etc. indicate orientation or positional relationships based on the orientation or positional relationships shown in the accompanying drawings, only for the convenience of describing the present disclosure and not for requiring the present disclosure to be constructed and operated in a specific orientation, and thus it cannot be understood as a limitation of the present disclosure. The terms "link", "connect", and "set" used in the present disclosure should be broadly understood, for example, they can be fixed connections or detachable connections; it can be directly connected or indirectly connected through intermediate components; and it can be a wired electrical connection, a wireless connection, or a wireless communication signal connection. For ordinary technical personnel in this field, the specific meanings of the above terms can be understood based on specific circumstances.

Figure 1:
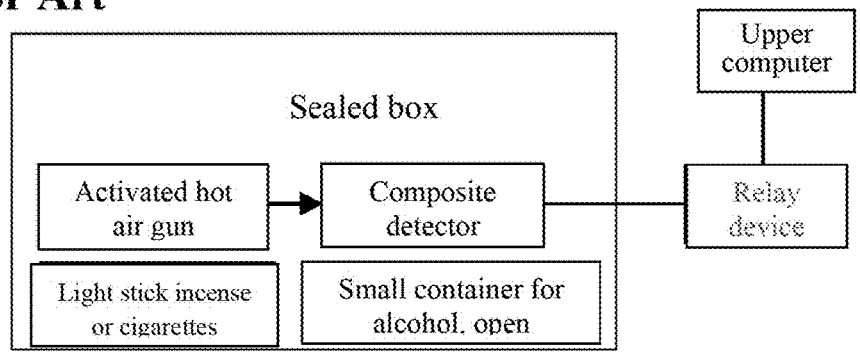
FIG. 1 is a schematic diagram of qualitative detection of composite detectors in prior art.
Figure 2:
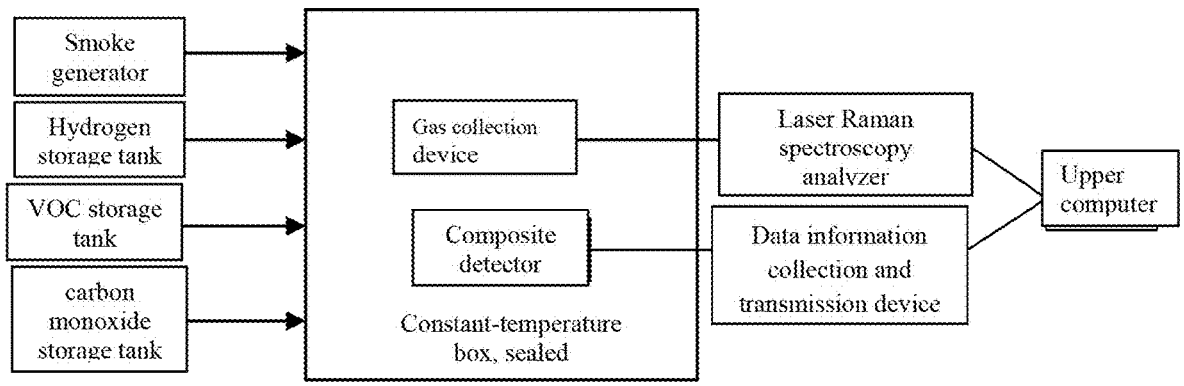
FIG. 2 is a schematic diagram of the connection of the detection system for the composite detector.
Figure 3:
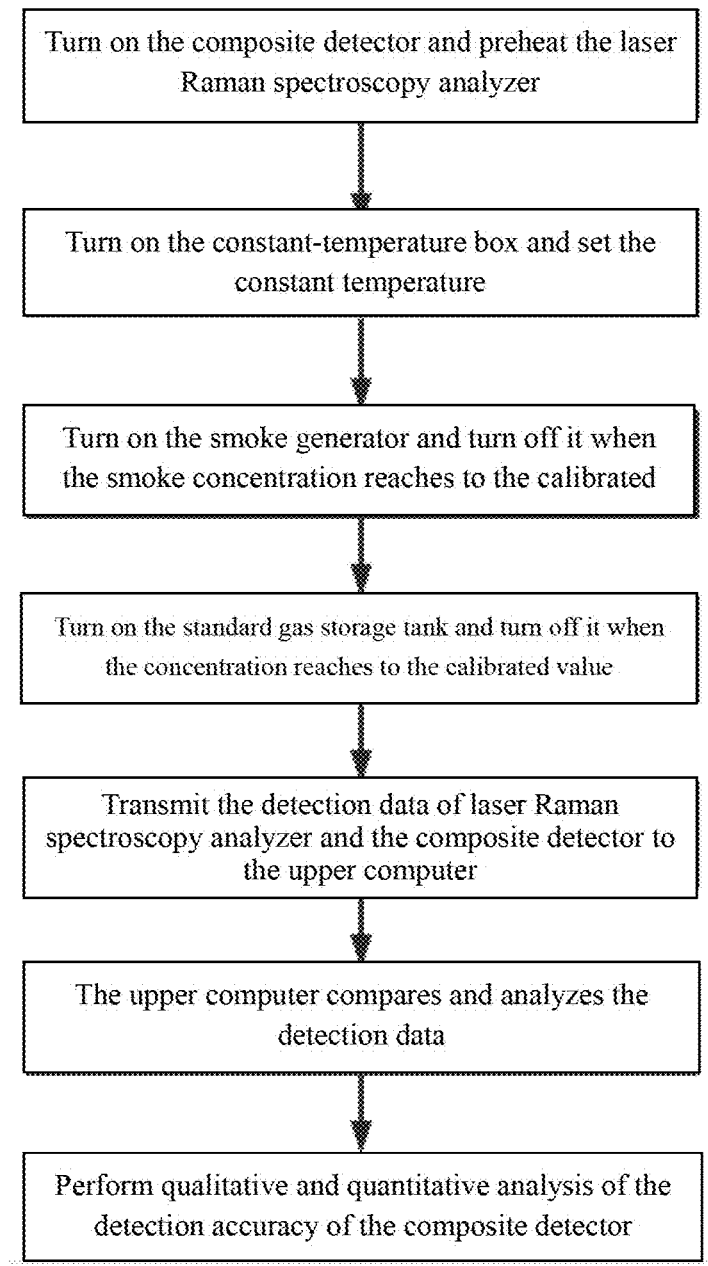
FIG. 3 is a schematic diagram of the steps of the detection method for a composite detector.

As shown in FIGS. 2 to 3, according to an embodiment of the present disclosure, a detection system for a composite detector is provided, which comprises a composite detector, a constant-temperature box, a smoke generator, a standard gas storage tank, a gas collection device and a laser Raman spectroscopy analyzer; wherein the constant-temperature box is sealed, and both the composite detector and the gas collection device are arranged in the constant-temperature box; the smoke generator, the standard gas storage tank and the laser Raman spectroscopy analyzer are all arranged outside the constant-temperature box; and the constant-temperature box, the smoke generator, and the standard gas storage tank are used to simulate a battery thermal runaway environment; the laser Raman spectroscopy analyzer receives gas from the gas collection device for detection and obtains gas detection data, the detection data is called the first detection data. The composite detector can detect the detection data, the detection data detected by the composite detector is called the second detection data, by comparing and analyzing the first detection data with the second detection data, the composite detector is calibrated, and a qualitative and quantitative detection result is obtained.

Preferably, the detection system further comprises a data information collection and transmission device and an upper computer, wherein the laser Raman spectroscopy analyzer is connected to the upper computer, the composite detector is connected to the upper computer through the data information collection and transmission device; and the upper computer compares and analyzes the first detection data with the second detection data.

Preferably, the standard gas storage tank comprises a hydrogen storage tank, a carbon monoxide storage tank and a VOC storage tank.

Preferably, detection accuracy of the laser Raman spectroscopy analyzer is 1% FS.

The present disclosure provides a detection system for a composite detector, which can perform an qualitative and quantitative detection for a composite detectors. The used detection system comprises a laser Raman spectroscopy analyzer, a hydrogen storage tank, a carbon monoxide storage tank, a VOC storage tank, a smoke generator, a constant-temperature box, a composite detector, a data information collection and transmission device and an upper computer and so on. The schematic diagram of the connection is shown in FIG. 2.

The laser Raman spectroscopy analyzer can perform qualitative and quantitative analysis of the molecular composition, structure, and relative content, such as solid, liquid and gaseous substances. The laser Raman spectroscopy analyzer is mainly used in natural gas analysis, biomass gas analysis, gas analysis of transformer oil fault, ethylene cracking furnace and other application scenarios. The advantages of the laser Raman spectroscopy analyzer are that it can monitor gas concentration in real-time online with fast detection speed, and can complete the analysis and measurement of all gases in 15 seconds. It can measure multiple components, especially for measuring the types of different hydrocarbons; the detection accuracy can reach up to 1% FS (FS refers to Full Scale).

The present disclosure further discloses an detection method for a composite detector utilizing the detection system for the composite detector, wherein the detection method comprises the following steps of:

S1: turning on the composite detector, and turning on the laser Raman spectroscopy analyzer for preheating for 20 minutes to make the laser Raman spectroscopy analyzer enter optimal working state;

S2: turning on the constant temperature box, and setting a constant temperature, and the temperature being maintained at 2° C. above a temperature sensing threshold of the composite detector.

In S2, maintain a constant temperature for 30 minutes to ensure that the temperature inside the box has reached the set temperature and remains stable before detecting. The constant temperature for 30 minutes is sufficient to stabilize the set temperature value.

S3: turning on the smoke generator and controlling a smoke concentration to reach a calibration value within a predetermined time, and turning off the smoke generator when the smoke concentration reaches the calibration value.

In S3, the predetermined time is the time range within which the smoke concentration produced by the smoke generator reaches the calibration value, approximately 1 minute to 2 minutes, to ensure efficiency and data accuracy. The calibration value refers to the smoke concentration reaching the alarm threshold of the composite detector. For example, when the smoke value reaches 0.5 db/m, the composite detector emits a first level alarm, and when the smoke value reaches 1.2 db/m, the composite detector emits a second level alarm. The alarm thresholds of different models of composite detectors may vary and are not fixed values, so the calibration values during detection should be determined based on the specifications of the composite detector.

S4: turning on the standard gas storage tanks, when the standard gas storage tank can comprise a VOC storage tank, a hydrogen storage tank, and a carbon monoxide storage tank, etc., then the VOC storage tank, hydrogen storage tank and carbon monoxide storage tank can be turned on successively in S4, the concentrations of VOC, hydrogen and carbon monoxide are controlled to reach the calibration value within a predetermined time, and when the concentrations of VOC, hydrogen and carbon monoxide reach the calibration value, the corresponding VOC storage tank, hydrogen storage tank, and carbon monoxide storage tank is turned off.

In S4, the predetermined time refers to the time range within which the concentrations of VOC, hydrogen, and carbon monoxide produced by the standard gas storage tank reach their respective calibration values. The entire process takes about 2 minutes to 3 minutes to ensure efficiency and data accuracy. The calibration value refers to the concentrations of VCO, hydrogen, and carbon monoxide reaching the alarm threshold of the composite detector. For example, when the VOC concentration reaches 200 ppm or the hydrogen concentration reaches 125 ppm or the carbon monoxide concentration reaches 50 ppm, the composite detector emits a first level alarm. When the VOC concentration reaches 300 ppm or the hydrogen concentration reaches 300 ppm or the carbon monoxide concentration reaches 190 ppm, the composite detector emits a second level alarm. The alarm thresholds of different models of composite detectors may vary and are not fixed values, so the calibration value during detection should be determined based on the specifications of the composite detector.

S5: by comparing and analyzing the first detection data with the second detection data, the composite detector is calibrated and a qualitative and quantitative detection result is obtained.

Specifically, when the detection system of the composite detector also comprises a data information collection and transmission device and an upper computer, the S5 specifically comprises the following steps of:

S51: within a specified detection time, the first detection data and the second detection data being transmitted to the upper computer through the data information collection and transmission device.

In S51, the first detection data comprise gas components and concentration changes of smoke, hydrogen, VOC and carbon monoxide, and qualitative and quantitative analysis of the gas and VOC components. The second detection data of the composite detector comprises temperature inside the constant temperature chamber, gas components and concentration changes of smoke, hydrogen, VOC, and carbon monoxide.

S52: the upper computer comparing and analyzing the first detection data with the second detection data; and S53. performing qualitative and quantitative analysis of detection accuracy of the composite detector.

The schematic diagram of the steps is shown in FIG. 3. By using the constant temperature box, the smoke generator, the standard gas storage tank, etc. to simulate the environment of battery thermal runaway, the sensitivity, detection accuracy, and functionality of the composite detector are scientifically judged by comparing and analyzing the first detection data with the second detection data.

The detection system and the detection method can be used to calibrate the composite detectors, give qualitative and quantitative detection results, calibrate the composite detectors, give quantitative data, and judge the detection accuracy and error of the composite detectors.

From the above description, it can be seen that the embodiments of the present disclosure achieve the following technical effects:

The present disclosure provides a qualitative and quantitative detection method and detection system for composite detector (carbon monoxide, hydrogen, VOC, temperature, smoke), and uses a standard gas generator or standard gas storage tank to simulate the environment of battery thermal runaway, and by comparing the detection data (the first detection data) of professional equipment (laser Raman spectroscopy analyzer) with the second detection data synchronously to scientifically determine whether the sensitivity, detection accuracy, and functionality of the composite detector meet the technical requirements.

The detection method is compliant and more suitable for standardized promotion and use, and the accuracy of the detection instrument meets the needs of quantitative detection and calibration.

In addition to the gas composition, temperature, and smoke to be detected, it can eliminate the interference of other impurities (soot, polycyclic aromatic hydrocarbons, tar, nicotine), reduce the dependent variable, and do not cause pollution and aging effects on the composite detector, so the detection method is more scientific.

By keep the temperature value inside the sealed box constant and consistent with the set temperature value, scientifically and reasonably control the temperature of the environment to be detected, and the detection results are more informative.

Based on the various characteristic gases generated during the thermal runaway of lithium batteries, this detection system can select different standard gases for the gas components to be detected, such as carbon monoxide standard gas, hydrogen standard gas, VOC, carbon dioxide standard gas, and alkane standard gas, which can meet the calibration requirements of composite detectors with multiple gas components.

The above-mentioned is only a preferred embodiments of the present disclosure and is not intended to limit it. For those skilled in the art, the present disclosure may undergo various modifications and variations. Any modifications, equivalent substitutions, improvements, etc. made within the spirit and principles of the present disclosure shall be comprised within the scope of protection of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A detection system for a composite detector, comprising: a composite detector, a constant-temperature box, a smoke generator, a standard gas storage tank, a gas collection device and a laser Raman spectroscopy analyzer, wherein
   the constant-temperature box is sealed, and both the composite detector and the gas collection device are arranged in the constant-temperature box;
   the smoke generator, the standard gas storage tank and the laser Raman spectroscopy analyzer are all arranged outside the constant-temperature box;
   the constant-temperature box, the smoke generator, and the standard gas storage tank are used to simulate a battery thermal runaway environment, the laser Raman spectroscopy analyzer receives gas from the gas collection device for detection and obtains a first detection data of the gas, the composite detector obtains a second detection data, and by comparing and analyzing the first detection data with the second detection data, the composite detector is calibrated, and a qualitative and quantitative detection result is obtained.

2. The detection system for a composite detector according to claim 1, further comprising a data information collection and transmission device and an upper computer, wherein the laser Raman spectroscopy analyzer is connected to the upper computer, and the composite detector is connected to the upper computer through the data information collection and transmission device; the upper computer compares and analyzes the first detection data with the second detection data.

3. The detection system for a composite detector according to claim 1, wherein the standard gas storage tank comprises a hydrogen storage tank, a carbon monoxide storage tank and a volatile organic compounds (VOC) storage tank.

4. The detection system for a composite detector according to claim 1, wherein detection accuracy of the laser Raman spectroscopy analyzer is 1% FS.

5. A detection method for a composite detector utilizing the detection system for a composite detector according to claim 1, wherein the detection method comprises the following steps of:
S1: turning on the composite detector, and turning on the laser Raman spectroscopy analyzer and for preheating;
S2: turning on the constant temperature box, and setting a constant temperature, and the temperature being maintained at 2° C. above a temperature sensing threshold of the composite detector;
S3: turning on the smoke generator and controlling a smoke concentration to reach a calibration value within a predetermined time, and turning off the smoke generator when the smoke concentration reaches the calibration value;
S4: turning on the standard gases storage tanks, and controlling the standard gas concentration to reach the calibration value within a predetermined time, and turning off the corresponding standard gas storage tank when the standard gas concentration reaches the calibration value; and
S5: by comparing and analyzing the first detection data with the second detection data, the composite detector being calibrated and a qualitative and quantitative detection result being obtained.

6. The detection method of the composite detector according to claim 5, wherein
the predetermined time in S3 is 1 minute to 2 minutes.

7. The detection method of the composite detector according to claim 5, wherein:
when the detection system of the composite detector is the detection system of the composite detector according to claim 3, S4 comprises:
turning on the VOC storage tank, the hydrogen storage tank and the carbon monoxide storage tank sequentially, and controlling concentrations of VOC, hydrogen and carbon monoxide to reach a calibration value within an predetermined time, respectively, and turning off the corresponding VOC storage tank, hydrogen storage tank, and carbon monoxide storage tank when the concentrations of VOC, hydrogen and carbon monoxide reaches the calibration value, respectively.

8. The detection method of the composite detector according to claim 7, wherein
the predetermined time in S4 is 2 minutes to 3 minutes.

9. The detection method of the composite detector according to claim 7, wherein
when the detection system of the composite detector is the detection system of the composite detector according to claim 2, S5 comprises:
S51: within a specified detection time, the first detection data and the second detection data being transmitted to the upper computer through the data information collection and transmission device;
S52: the upper computer comparing and analyzing the first detection data with the second detection data; and
S53: performing qualitative and quantitative analysis of detection accuracy of the composite detector.

10. The detection method of the composite detector according to claim 5, wherein
the predetermined time in S5 is 6 minutes to 8 minutes.

11. The detection method of the composite detector according to claim 5, wherein
the first detection data comprises gas component and concentration changes of smoke, hydrogen, VOC and carbon monoxide in S5;
the second detection data comprises temperature inside the constant temperature chamber, and gas component and concentration changes of smoke, hydrogen, VOC and carbon monoxide.

12. The detection method of the composite detector according to claim 5, wherein
preheating the laser Raman spectroscopy analyzer for 20 minutes in S1, and maintaining a constant temperature for 30 minutes in S2.

* * * * *